United States Patent
Birkeneder

(10) Patent No.: US 7,513,339 B2
(45) Date of Patent: Apr. 7, 2009

(54) PNEUMATICALLY AND/OR ELECTROMECHANICALLY ACTUATED DISK BRAKE FOR A UTILITY VEHICLE

(75) Inventor: Franz-Josef Birkeneder, Aldersbach (DE)

(73) Assignee: Knorr-Bremse Systeme fuer Nutzfahrzeuge GmbH, Munich (DE)

( * ) Notice: Subject to any disclaimer, the term of this patent is extended or adjusted under 35 U.S.C. 154(b) by 0 days.

(21) Appl. No.: 11/943,835

(22) Filed: Nov. 21, 2007

(65) Prior Publication Data

US 2008/0128222 A1 Jun. 5, 2008

Related U.S. Application Data

(63) Continuation of application No. PCT/EP2006/004759, filed on May 19, 2006.

(30) Foreign Application Priority Data

May 25, 2005 (DE) .................. 10 2005 024 119

(51) Int. Cl.
*F16D 55/08* (2006.01)
(52) U.S. Cl. ............... 188/72.9; 188/265; 188/72.6; 188/71.7
(58) Field of Classification Search ............. 188/72.9, 188/73.1, 265, 72.6, 71.7; 303/89
See application file for complete search history.

(56) References Cited

U.S. PATENT DOCUMENTS

| 3,534,835 | A | | 10/1970 | Meier |
| 3,690,417 | A | * | 9/1972 | Airheart .................. 188/71.8 |
| 5,078,456 | A | * | 1/1992 | Cox .......................... 303/89 |
| 5,547,048 | A | | 8/1996 | Anthony |
| 7,234,785 | B1 | * | 6/2007 | McCann et al. ............ 303/89 |
| 2004/0026181 | A1 | | 2/2004 | Baumgartner et al. |

FOREIGN PATENT DOCUMENTS

DE 42 30 005 A1 3/1994

OTHER PUBLICATIONS

International Search Report dated Aug. 16, 2006 (four (4) pages).
International Preliminary Report on Patentability and Form PCT/ISA/237 with English translation dated Dec. 13, 2007 (eleven (11) pages).

* cited by examiner

*Primary Examiner*—Melanie Torres
(74) *Attorney, Agent, or Firm*—Crowell & Moring LLP

(57) ABSTRACT

A disk brake mechanism is described, comprising one of a pneumatic and electromechanical actuator having a brake piston, a brake application device for actuating the disk brake mechanism, and a fixed-type brake caliper attached to an axle, for moving a reaction-side brake lining against a brake disk during application. The mechanism also includes a pivoting lever of the brake application device, operatively connected to the brake piston for pressing an application-side brake lining during application, the pivoting lever being supported on one side on the brake caliper, and a supporting part forming, after a predefined stroke portion of an application stroke of the brake piston, an abutment for the pivoting lever between a pressure region of the application-side brake lining on the pivoting lever, and a support of the pivoting lever on the brake caliper.

14 Claims, 1 Drawing Sheet

PNEUMATICALLY AND/OR ELECTROMECHANICALLY ACTUATED DISK BRAKE FOR A UTILITY VEHICLE

CROSS REFERENCE TO RELATED APPLICATIONS

This application is a continuation of PCT International Application No. PCT/EP2006/004759, filed 19 May 2006, which claims priority under 35 U.S.C. § 119 to German Patent Application No. DE 10 2005 024 119.0 filed May 25, 2005, the entire disclosures of which are herein expressly incorporated by reference.

BACKGROUND AND SUMMARY OF THE INVENTION

The present invention relates to a pneumatically and/or electromechanically actuated disk brake for a utility vehicle having a brake application device.

Disk brakes of this type which are known as a fixed caliper brake use the reaction force principle in such a way that, as a result of elastic deformation of the brake caliper after pressing of the brake lining which is pressed against the brake disk by way of the brake application device, the opposite brake lining is pressed onto the brake disk.

In an exemplary embodiment, the brake caliper itself and/or a connecting flange, via which the brake caliper is connected fixedly to the axle part, can be elastically deformable. The brake caliper is deformed to such an extent that an air play is overcome between the brake disk and the reaction-side brake lining.

In order to compensate for brake lining and/or brake disk wear, each brake lining is assigned an adjusting device which ensures that the air play remains constant between the respective brake lining and the brake disk.

However, it is disadvantageous in this case that nonuniform wear of the two brake linings occurs, which is disadvantageous, since, for example, the service life of the linings does not correspond to the desired length. Moreover, axial forces act on the wheel bearing, which likewise has the consequence of a limitation of the service life, with the resultant consequential costs with regard to necessary repairs.

The present invention is based on the development of a disk brake of the generic type in such a way that its operational reliability is improved and its service life is increased.

According to an exemplary embodiment of the invention, a supporting part is provided in the region of the pivoting lever, which supporting part is arranged and designed in such a way that, during a brake application movement of the pivoting lever, it forms an abutment for the pivoting lever after a predefined stroke of the brake piston between the pressure region of the brake lining on the pivoting lever and its support on the brake caliper.

The exemplary supporting part is preferably configured as a stop pin which is connected fixedly to the pivoting lever and, in the functional case, is supported on an axle part or on a part which is connected fixedly to the axle, for example on an inner projection of the brake caliper.

Unlike in conventional systems, where the action-side brake lining has to be pressed onto the stationary brake disk in order to generate the reaction force, the embodiments of the present invention achieve a situation where the brake caliper is already deformed elastically by the reaction-side brake lining being pulled in toward the brake disk, when the action-side brake lining is not yet in engagement with the brake disk.

According to embodiments of the invention, the two brake linings are loaded more uniformly as a result of them being used more synchronously as a result of this configuration in a further brake application. The effect of nonuniform wear is therefore reduced, with the result that the service life of the brake linings is increased.

There is provision according to one advantageous embodiment of the invention for the supporting part to be configured as a stop pin which extends in the brake application direction, and comes into contact with the part which is fixed to the axle and extends transversely with respect to said brake application direction.

In this embodiment, the length and the position on the pivoting lever are selected in such a way that the stop pin bears against the part which is fixed to the axle after half of the brake application path.

In addition to attaching the stop pin directly on the pivoting lever, it is also envisioned to connect the stop pin fixedly to the rigid axle part, with the result that the pivoting lever is supported on said stop pin during the brake application movement.

Other objects, advantages and novel features of the present invention will become apparent from the following detailed description of the invention when considered in conjunction with the accompanying drawings.

BRIEF DESCRIPTION OF THE DRAWING

One exemplary embodiment of the invention will be described in the following text using the appended drawing.

The single FIGURE shows a part detail of a disk brake according to the invention in a diagrammatic side view.

DETAILED DESCRIPTION OF THE DRAWING

Figure 1:
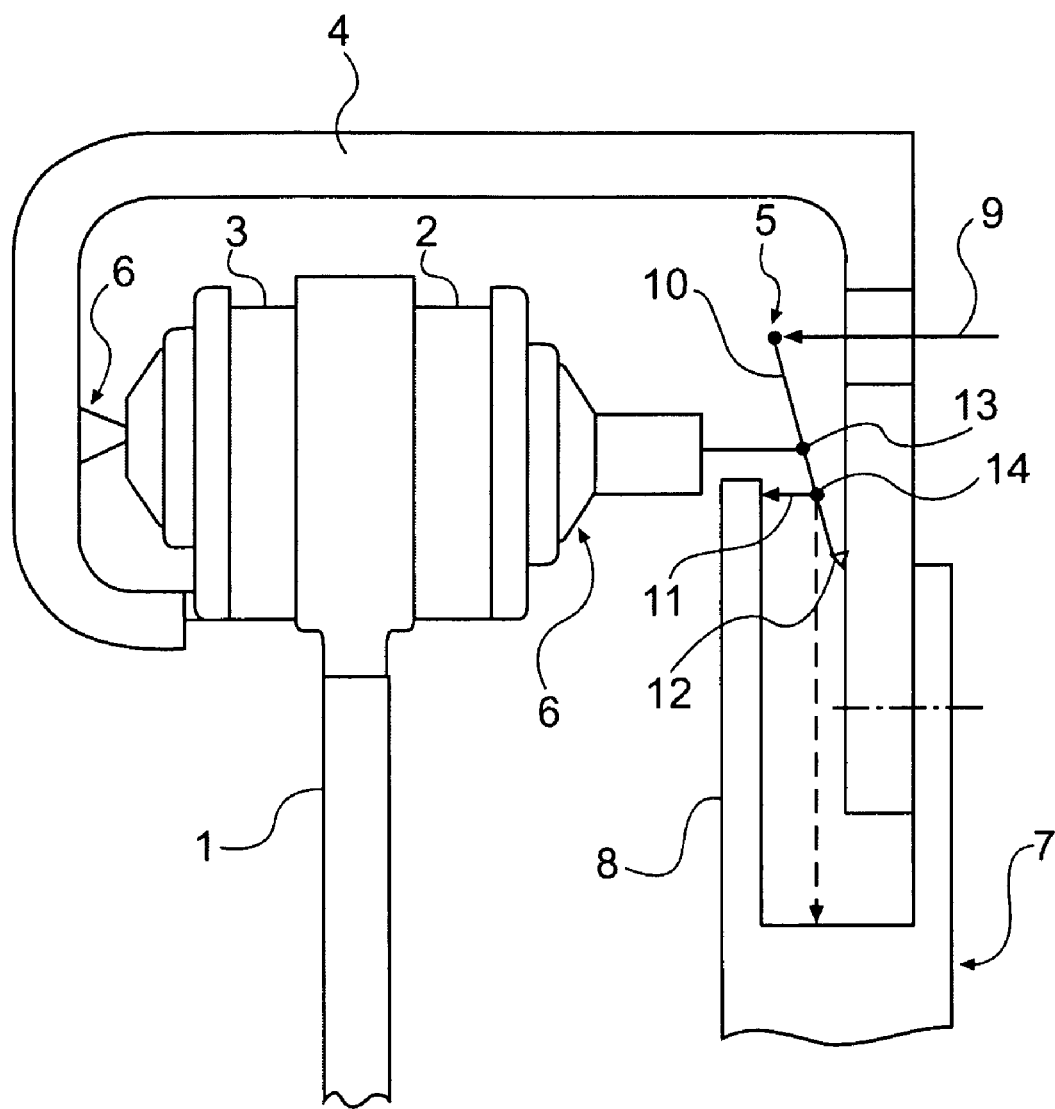

The FIGURE shows an exemplary disk brake for a utility vehicle according to an embodiment of the invention that is mechanically activated, for example with an electromechanical or a pneumatic actuator, which disk brake has a brake caliper 4 which reaches over a preferably axially fixed disk 1 and is configured as a fixed caliper which may be elastically deformable per se, or which may be alternatively on an elastically deformable axle part and is fastened to the axle part 7. The brake disk can also be deformable or axially movable to a limited extent, for example, in the region of its friction disk, with the result that partially the disk and partially the caliper are deformed in this case during brake application.

Brake linings 2, 3 are arranged on both sides of the brake disk 1, which brake linings 2, 3 are provided in each case with an adjusting device 6, by way of which a wear stroke of the brake linings 2, 3 can be adjusted.

The brake lining 2 which is arranged on the right in the exemplary embodiment is assigned a brake application device 5, via which the brake lining 2 can be pressed against the brake disk 1 as action-side brake lining.

The exemplary brake application device 5 has a rotary or pivoting lever 10 which is supported on one side on the brake caliper 4 and on the other side acts on a brake piston 9 of an actuator directly or via further intermediate elements such as a roll, optionally a bridge or the like. During an actuation of the brake application device 5, the brake piston 9 is moved in the direction of the brake disk 1, the brake lining 2 and adjusting device 6, which bear indirectly in a pressure region 13 being moved in the direction of the brake disk 1.

The exemplary pivoting lever 10 may be configured as an eccentric in the region of the support 12 on the brake caliper 4, in a manner which is known, as is shown, for example, in German patent document DE 42 30 005 A1.

According to an exemplary embodiment of the invention, a supporting part 11 is provided in the region of the pivoting lever 10. The supporting part 11, during a brake application movement of the pivoting lever 10, forms an abutment after a predefined stroke of the brake piston 9 between the pressure region 13 of the brake lining 2 on the pivoting lever 10 and its support 12 on the brake caliper 4.

In the example which is shown, the supporting part 11 comprises a stop pin which is connected fixedly to the pivoting lever 10 via a connection 14.

During actuation of the brake application device 5 and pivoting of the pivoting lever 10, the action-side brake lining 2 is first pressed in the direction of the brake disk 1, until the supporting part 11 comes into contact with an axle flange 8 of the axle part 7. After further brake application, the elastic brake caliper 4 is moved counter to the brake application direction by the support of the supporting part 11, with driving of the reaction-side brake lining 3, the action-side brake lining 2 being pressed further at the same time in the direction of the brake disk 1, until both brake linings 2, 3 bear against the brake disk 1. The invention achieves a situation where the reaction-side brake lining 3 is not guided in the direction of the brake disk 1 only when the action-side brake lining 2 already bears against the brake disk 1, but rather before that, with the result that the effect of nonuniform wear of the brake linings 2, 3 is reduced.

According to exemplary embodiments of the invention, the length of the supporting part 11 and its positioning between the pressure region 13 and the support 12 determine the length of the brake application stroke, according to which the reaction-side brake lining 3 is pulled in the direction of the brake disk 1.

In a different embodiment of the invention, instead of the supporting part 11 bearing against the axle flange 8 which extends parallel to the brake disk 1, the actuating direction of the supporting part 11 can also be oriented offset by 90° in accordance with the dashed line.

The following listing of reference numbers is provided to facilitate understanding of the drawing and specification.
1 Brake disk
2 Brake lining
3 Brake lining
4 Brake caliper
5 Brake application device
6 Adjusting device
7 Axle part
8 Axle flange
9 Brake piston
10 Pivoting lever
11 Supporting part
12 Support
13 Pressure region
14 Connection The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. A mechanically actuated disk brake for a utility vehicle, comprising:
    a brake application device for applying the brake;
    a brake caliper which reaches over an axially fixed brake disk, is fastenable to an axle part and is designed as a fixed caliper which, during brake application movements, moves a reaction-side brake lining against the brake disk via elastic deformation;
    a pivoting lever of the brake application device which is supported on one side on the brake caliper and which acts on another side on a brake piston, via which the application-side brake lining is pressable onto the brake disk;
    adjusting devices arranged in the brake caliper for compensating for wear of at least one of the brake lining and brake disk, each brake lining being assigned at least one adjusting device; and
    a supporting part provided in the region of the pivoting lever, forming, during a brake application movement of the pivoting lever, an abutment for the pivoting lever after a predefined stroke of the brake piston, between a pressure region of the brake lining on the pivoting lever and a support of the pivoting lever on the brake caliper.

2. The disk brake as claimed in claim 1, wherein the supporting part is configured as a stop pin connected fixedly to the pivoting lever and, during operation, is supported on one of the axle part and on a part which is connected fixedly to the axle.

3. The disk brake as claimed in claim 1, wherein the supporting part is configured as a stop pin connected fixedly to the axle part and on which the pivoting lever is supported in a functional position.

4. The disk brake as claimed in claim 1, wherein the supporting part extends in a brake application direction.

5. A mechanically actuated disk brake for a utility vehicle, comprising:
    a brake application device for applying the brake;
    a brake caliper which reaches over an axially fixed brake disk, is fastenable to an axle part and is designed as a fixed caliper which, during brake application movements, moves a reaction-side brake lining against the brake disk via elastic deformation;
    a pivoting lever of the brake application device which is supported on one side on the brake caliper and which acts on another side on a brake piston, via which the application-side brake lining is pressable onto the brake disk;
    adjusting devices arranged in the brake caliper for compensating for wear of at least one of the brake lining and brake disk, each brake lining being assigned at least one adjusting device; and
    a supporting part provided in the region of the pivoting lever, forming, during a brake application movement of the pivoting lever, an abutment for the pivoting lever after a predefined stroke of the brake piston, between a pressure region of the brake lining on the pivoting lever and a support of the pivoting lever on the brake caliper,
    wherein a stop pin, connected fixedly to the axle part and on which the pivoting lever is supported in a functional position, one of bears against and is fastened to an axle flange.

6. The disk brake as claimed in claim 5, wherein the axle flange extends transversely with respect to a brake application direction.

7. The disk brake as claimed in claim 1, wherein the supporting part extends transversely with respect to a brake application direction.

8. The disk brake as claimed in claim 1, wherein the supporting part has a length and a position on the pivoting lever adapted to bear against one of the axle part and against the pivoting lever over approximately half a length of a brake application stroke.

9. The disk brake as claimed in claim 1, wherein the mechanically actuated disk brake comprises one of a pneumatically and electromechanically actuated disk brake.

10. A disk brake mechanism, comprising:
- one of a pneumatic and electromechanical actuator having a brake piston;
- a brake application device for actuating the disk brake mechanism;
- a fixed-type brake caliper attached to an axle, for moving a reaction-side brake lining against a brake disk during application;
- a pivoting lever of the brake application device, operatively connected to the brake piston for pressing an application-side brake lining during application, the pivoting lever being supported on one side on the brake caliper; and
- a supporting part forming, after a predefined stroke portion of an application stroke of the brake piston, an abutment for the pivoting lever between a pressure region of the application-side brake lining on the pivoting lever, and a support of the pivoting lever on the brake caliper, wherein
- the supporting part comprises a stop pin connected fixedly to one of the pivoting lever, thus being supportable during application by an axle part, and an axle part, thus supporting during application the pivoting lever.

11. The disk brake mechanism according to claim 10, further comprising adjusting devices disposed in the brake caliper for compensating wear of at least one of the brake disk and brake lining.

12. The disk brake mechanism according to claim 10, wherein the supporting part comprises a protrusion extending in a brake application direction.

13. The disk brake mechanism according to claim 10, further comprising an axle flange extending substantially transversely relative to a brake application direction.

14. The disk brake mechanism according to claim 10, wherein the supporting part has a length and a location selected to abut over the predefined stroke portion corresponding to substantially half of the application stroke.

* * * * *